(12) United States Patent
Cook et al.

(10) Patent No.: US 10,345,562 B2
(45) Date of Patent: Jul. 9, 2019

(54) ALL-REFLECTIVE SOLAR CORONAGRAPH SENSOR AND THERMAL CONTROL SUBSYSTEM

(71) Applicant: Raytheon Company, Waltham, MA (US)

(72) Inventors: Lacy G. Cook, El Segundo, CA (US); Jose B. Quezada, Torrance, CA (US); Neil R. Nelson, Anaheim, CA (US)

(73) Assignee: Raytheon Company, Waltham, MA (US)

( * ) Notice: Subject to any disclaimer, the term of this patent is extended or adjusted under 35 U.S.C. 154(b) by 124 days.

(21) Appl. No.: 15/426,790

(22) Filed: Feb. 7, 2017

(65) Prior Publication Data

US 2018/0224642 A1 Aug. 9, 2018

(51) Int. Cl.
*G02B 17/02* (2006.01)
*G02B 17/06* (2006.01)
(Continued)

(52) U.S. Cl.
CPC ........... *G02B 17/023* (2013.01); *G02B 5/003* (2013.01); *G02B 7/181* (2013.01); *G02B 7/1815* (2013.01); *G02B 17/006* (2013.01); *G02B 17/008* (2013.01); *G02B 17/0657* (2013.01); *G02B 23/02* (2013.01); *G02B 23/06* (2013.01); *G02B 27/1066* (2013.01); *G02B 27/141* (2013.01);
(Continued)

(58) Field of Classification Search
CPC .... G02B 17/023; G02B 17/006; G02B 7/181; G02B 23/02; G02B 27/1066; G02B 27/141; H04N 5/2254; H04N 5/332

USPC ........................................................ 359/351
See application file for complete search history.

(56) References Cited

U.S. PATENT DOCUMENTS 3,748,015 A 7/1973 Offner
4,240,707 A 12/1980 Wetherell et al.
(Continued)

FOREIGN PATENT DOCUMENTS

EP 2916157 B1 8/2016

OTHER PUBLICATIONS

Bendek et al., Space telescope design image the habitable zone of Alpha Centauri, Techniques and Instrumentation for Detection of Exoplanets VII, Sep. 16, 2015, 15 pages, vol. 9605, SPIE.
(Continued)

*Primary Examiner* — Collin X Beatty (57) ABSTRACT

An all-reflective coronagraph optical system for continuously imaging a wide field of view. The optical system can comprise a fore-optics assembly comprising a plurality of mirrors that reflect light rays, about a wide field of view centered around the Sun, to an aft-optics assembly that reflects the light rays to an image sensor. A fold mirror, having an aperture, is optically supported between the fore-optics assembly and the aft-optics assembly. The aperture defines an angular subtense (e.g., 1.0 degree) sized larger than the angular subtense of the Sun. The aperture facilitates passage of a direct solar image and a solar thermal load. A thermal control subsystem comprises a shroud radiatively coupled to each fore-optics mirror and the fold mirror. A cold radiator is thermally coupled to each shroud. Heaters adjacent fore optics mirrors and the fold mirror control temperature to provide a steady state optical system to minimize wavefront error.

22 Claims, 6 Drawing Sheets

(51) Int. Cl.

| | | |
|---|---|---|
| *G02B 17/00* | (2006.01) | |
| *G02B 7/18* | (2006.01) | |
| *G02B 27/14* | (2006.01) | |
| *G02B 27/10* | (2006.01) | |
| *G02B 23/02* | (2006.01) | |
| *H04N 5/225* | (2006.01) | |
| *H04N 5/33* | (2006.01) | |
| *G02B 5/00* | (2006.01) | |
| *G02B 23/06* | (2006.01) | |
| *B64G 1/10* | (2006.01) | |

(52) U.S. Cl.
CPC ......... *G02B 27/143* (2013.01); *H04N 5/2254* (2013.01); *H04N 5/332* (2013.01); *B64G 2001/1057* (2013.01)

(56) References Cited

U.S. PATENT DOCUMENTS

| | | | |
|---|---|---|---|
| 4,923,293 A | | 5/1990 | Nelles et al. |
| 5,078,502 A | | 1/1992 | Cook |
| 5,331,470 A | | 7/1994 | Cook |
| 5,404,869 A | * | 4/1995 | Parkyn, Jr. ............... F24S 23/31 |
| | | | 126/699 |
| 5,608,526 A | | 3/1997 | Piwonka-Corle et al. |
| 6,178,047 B1 | | 1/2001 | Cook |
| 7,130,051 B2 | | 10/2006 | Oppenheimer et al. |
| 7,715,099 B2 | | 5/2010 | Shih |
| 8,280,104 B2 | | 10/2012 | Deforest |
| 8,714,760 B2 | | 5/2014 | Cook |
| 8,743,457 B2 | | 6/2014 | Sivaramakrishnan et al. |
| 9,523,516 B2 | * | 12/2016 | Hebrink ............... G02B 5/0841 |
| 2004/0156087 A1 | | 8/2004 | Oppenheimer et al. |
| 2007/0286461 A1 | | 12/2007 | Deforest |
| 2012/0268836 A1 | | 10/2012 | Mercado |
| 2017/0359495 A1 | * | 12/2017 | Hawes ................... H04N 5/238 |

OTHER PUBLICATIONS

Guyon et al., Telescope to Observe Planetary Systems (TOPS): a high throughout 1.2-m visible telescope with a small inner working angle, arxiv.org, Jun. 16, 2006, Cornell University, 12 pages, Ithaca, New York.

Vives et al., Demonstrator of the formation flying solar coronagraph ASPIICS/PROBA-3, SPIE Astronomical Telescopes + Instrumentation, Aug. 11, 2010, 11 pages, vol. 7731, SPIE, San Diego, California.

International Search Report for International Application No. PCT/US2017/046600 dated Mar. 16, 2018, 17 pages.

* cited by examiner

ALL-REFLECTIVE SOLAR CORONAGRAPH SENSOR AND THERMAL CONTROL SUBSYSTEM

BACKGROUND

Sensing objects close to a solar line of sight (e.g., near the Sun) with a wide field of view and for long periods of time is problematic because known telescope optical systems cannot tolerate the extreme solar thermal load on components of the system. As a result, they suffer very significant image quality degradation due to optics misalignments and distortion of the optical surfaces, and thus become unsuitable for their intended purposes.

Existing coronagraphs can sense objects close to the Sun in a narrow field of view and a narrow spectral band, typically for only a transient period of time because the solar thermal load is too intense for the components of the coronagraph to effectively sense the objects without problematic degradation. Such coronagraphs typically implement a significant shield or baffle to block-out a direct solar image of the Sun. Thus, they suffer the restriction of not being able to view certain objects very near the Sun.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "a wide field of view" refers to a field of view that is at least 2-3 degrees (and perhaps at least 5 degrees in some cases). In other cases, a wide field of view can be at least 10 degrees, and may exceed 20 to 30 degrees.

An initial overview of technology embodiments is provided below and then specific technology embodiments are described in further detail later. This initial summary is intended to aid readers in understanding the technology more quickly.

In one example, disclosed is a coronagraph optical system for continuously imaging a wide field of view. The optical system can comprise a fore optics assembly having an entrance aperture positionable towards the Sun. The fore optics assembly can comprise a plurality of mirrors that reflect light rays about a wide field of view centered around the Sun. An aft optics assembly can be configured to reflect the light rays to at least one sensor (e.g., an image sensor). A fold mirror can be optically supported between the fore optics assembly and the aft optics assembly to reflect the light rays to the aft optics assembly. The fold mirror can have an aperture defining an angular subtense sized larger than the angular subtense of the Sun. The fold mirror is positionable (e.g., at the image of the fore optics) such that a direct solar image of the Sun, reflected by the fore optics assembly, passes through the aperture while the entrance aperture of the fore optics assembly is continuously positioned towards the Sun.

In one example, the optical system can comprise a thermal control subsystem coupled to the fore optics assembly and the fold mirror. The thermal control subsystem can transfer away heat such that the entrance aperture can be continuously positioned towards the Sun.

In one example, the thermal control subsystem comprises a plurality of heat transfer shrouds, and each heat transfer shroud can be radiatively coupled to one of the plurality of mirrors and the fold mirror for transferring heat.

In one example, the fore optics assembly further comprises an optical bench containing the plurality of mirrors and the fold mirror, and the thermal control subsystem can comprise a plurality of heat transfer members each thermally coupled to one of the heat transfer shrouds and the optical bench. The plurality of heat transfer members can be thermally coupled to at least one cold-bias heat pipe.

In one example, the thermal control subsystem comprises a primary heat transfer member thermally coupled to the optical bench and at least one cold-bias heat pipe.

In one example, the thermal control subsystem comprises a plurality of heaters thermally coupled to each of the plurality of mirrors and the fold mirror for controlling the temperature of the fore optics assembly.

In one example, the plurality of mirrors, the fold mirror, and the optical bench are each comprised of a low thermal expansion material comprising at least one of silicon carbide, low expansion glass, and low expansion composite.

In one example, each heat transfer shroud is radiatively coupled about a majority of a surface area of each of the plurality of mirrors and the fold mirror.

In one example, the wide field of view is between 5 degrees and approximately 30 degrees.

In one example, the aft optics assembly comprises a plurality of reflective mirrors, and wherein the fore optics and the aft optics assemblies facilitate an all-reflective optical path.

In one example, the optical system comprises a steady state position in which the sensor is configured to continuously be directed to a line of sight of the Sun for a predetermined time period.

In one example, the predetermined time period comprises at least 10 hours.

In one example, the sensor comprises at least one of a longwave infrared focal plane array and a visible focal plane array.

In one example, the coronagraph optical system comprises a dichroic beam splitter operable to split light rays to the longwave infrared focal plane array and to the visible focal plane array to image objects in two spectral bands.

In one example there is provided a method for continuously imaging a wide field of view centered about the Sun using a coronagraph optical system. The method can comprise positioning an entrance aperture of a fore optics assembly of a coronagraph optical system towards the Sun. The fore optics assembly can comprise a plurality of mirrors that reflect light rays about a wide field of view centered about the Sun. The method can comprise positioning an aperture of a fold mirror approximately toward a direct solar image of the Sun to remove a solar load on the coronagraph optical system. The fold mirror can reflect the light rays from the fore optics assembly to the aft optics assembly. The method can comprise controlling a temperature of the plurality of mirrors and the fold mirror via a thermal control subsystem such that the entrance aperture can be continuously positioned towards the Sun.

The method can comprise positioning the aft optics assembly to reflect the light rays to at least one sensor.

The method can comprise removing all or most of the solar load from the coronagraph optical system before the light rays are reflected to the aft optics assembly by the fold mirror.

The method can comprise transferring heat away from each of the plurality of mirrors and the fold mirror via at least one cold-bias heat pipe thermally coupled to the radiator.

The method can comprise simultaneously imaging objects in two spectral bands by splitting the light rays to a longwave infrared focal plane array and to a visible focal plane array.

Figure 1A:
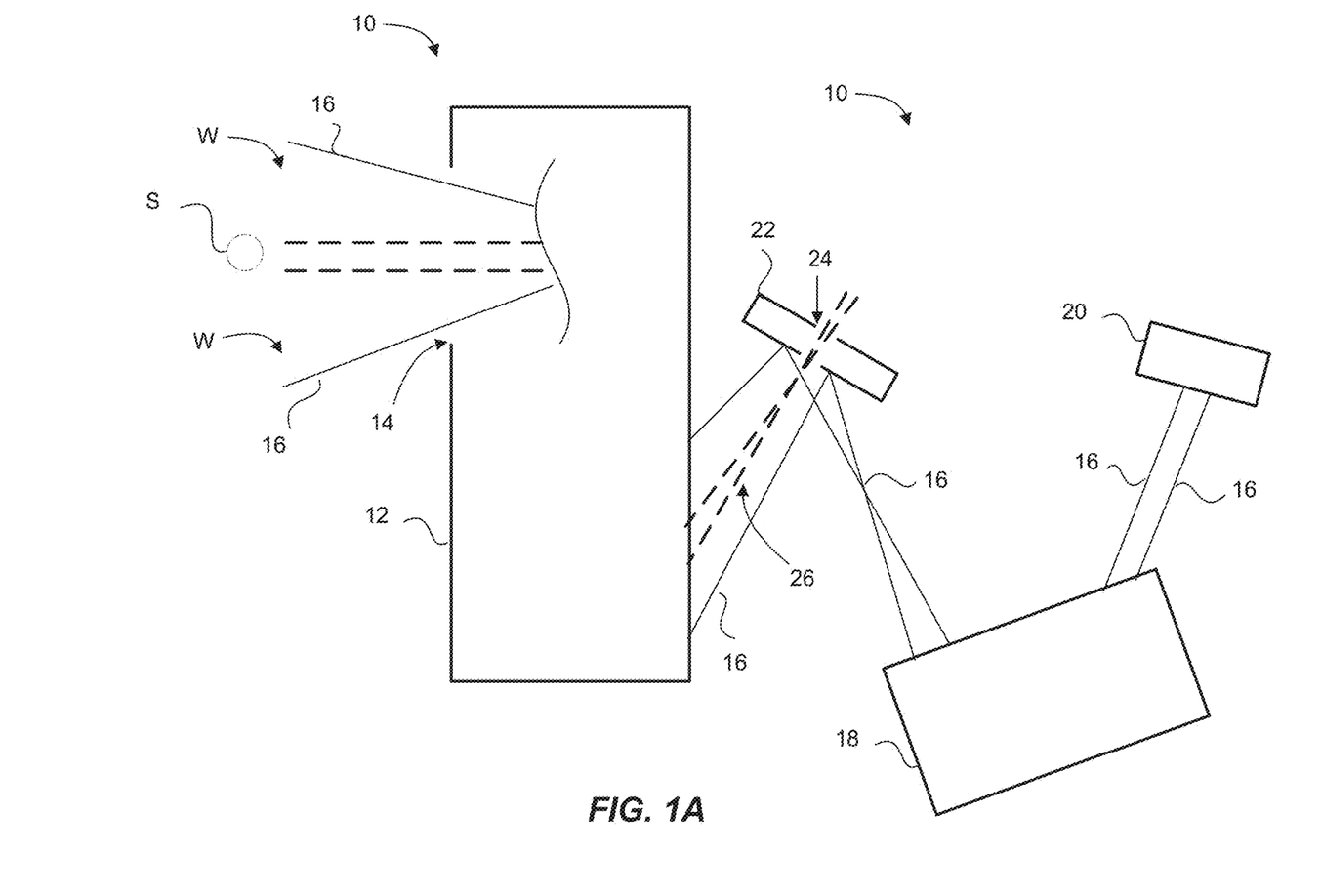
FIG. 1A illustrates a schematic of a coronagraph optical system in accordance with an example of the present disclosure.

FIG. 1A shows an example of a coronagraph optical system 10 for continuously imaging a wide field of view W The optical system 10 can comprise a fore optics assembly 12 having an entrance aperture 14 positionable towards the Sun S (a direct image of the Sun is represented by dashed lines at approximately a center of the wide field of view W at the left side of FIG. 1A). The fore optics assembly 12 can comprise a plurality of mirrors (e.g., see FIGS. 1B and 2) that reflect light rays 16 about the wide field of view W centered around the Sun S. An aft optics assembly 18 can be configured to reflect the light rays 16 to at least one sensor 20 (e.g., an image sensor). A fold mirror 22 can be optically supported between the fore optics assembly 12 and the aft optics assembly 18 to reflect the light rays 16 to the aft optics assembly 18 (which can have a plurality of mirrors; see e.g., FIG. 1B). The fold mirror 22 can have an aperture 24 defining an angular subtense sized larger than the angular subtense of the Sun S (e.g., see the discussion regarding FIG. 1B-3C below). The fold mirror 22 is positionable at the fore optics image, such that a direct solar image 26 of the Sun S, reflected by the fore optics assembly 12, passes through the aperture 24 while the entrance aperture 14 of the fore optics assembly 12 is continuously open and positioned towards the Sun S. As will be further discussed in other examples, a thermal control system (not shown) can be incorporated to control the temperature of the coronagraph optical system 10, thereby facilitating the entrance aperture to be continuously open and positioned towards the Sun for reflecting a wide field of view to at least one sensor (or other detector).

The coronagraph optical system 10 of FIG. 1A (and the examples of coronagraph optical systems described below) can be an all-reflective telescope coronagraph, which means that it is capable of imaging any wavelength band. Moreover, the coronagraph optical systems discussed herein can perform this while continuously imaging a wide field of view (e.g., between 5 degrees and at least 30 degrees, or more). This is a major improvement and advantage over known systems. Known coronagraphs can only image about 1-2 degrees narrow field of view and a narrow spectral band, and typically for only a transient period of time (e.g., a few seconds or minutes).

As further discussed herein, "continuously" viewing (a wide field of view centered around Sun) can mean that the disclosed systems can image objects near the Sun for many hours, weeks, or even indefinitely, in a steady state without suffering meaningful degradation of system components. This advantage is achieved and provided for by the examples coronagraph optical systems discussed herein.

Figure 1B:
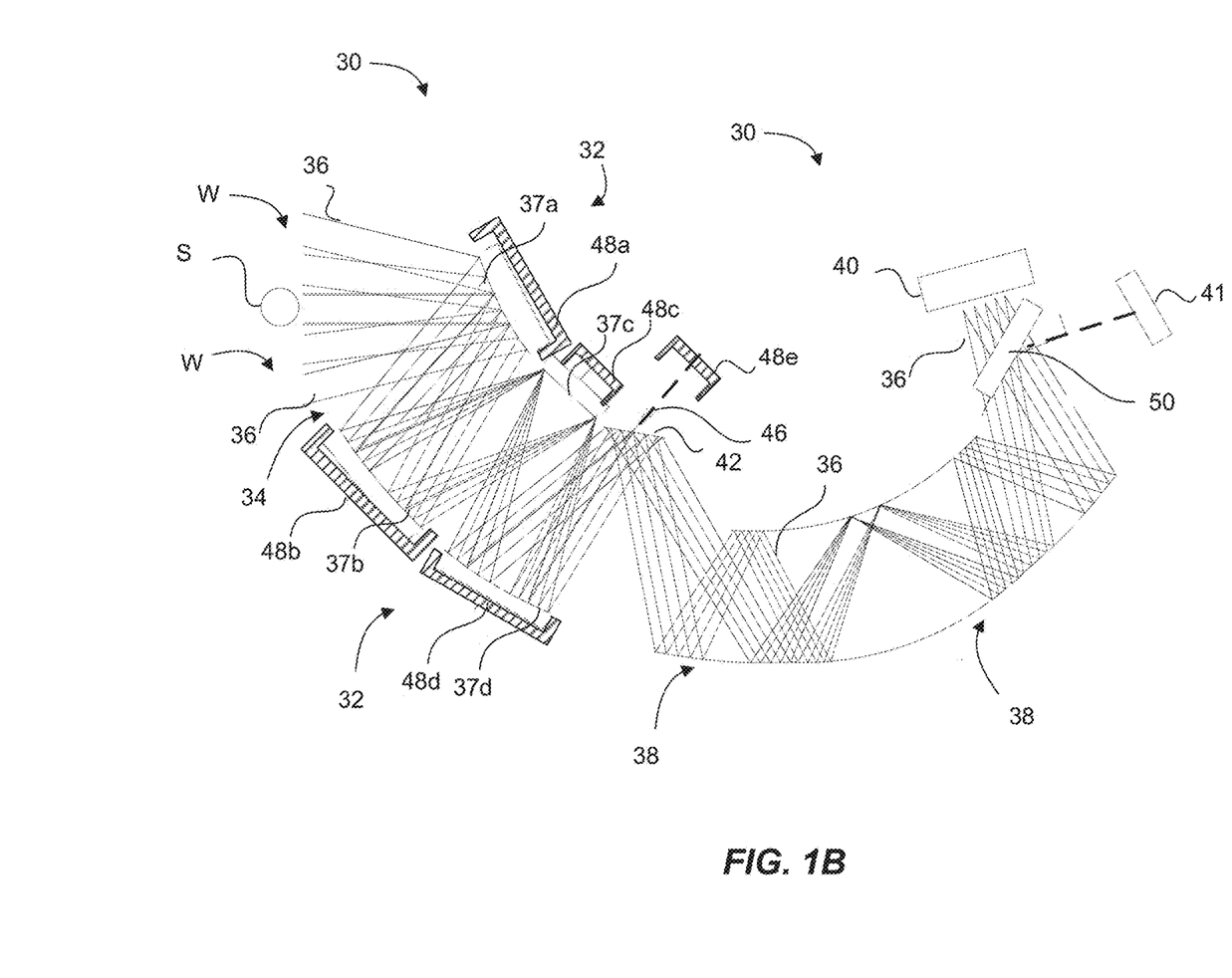
FIG. 1B illustrates a schematic of a coronagraph optical system in accordance with an example of the present disclosure.

FIG. 1B schematically illustrates an example coronagraph optical system 30, such as the coronagraph optical system 10 generally described regarding FIG. 1A. The coronagraph optical system 30 can comprise a fore optics assembly 32 having an entrance aperture 34 positionable towards the Sun S (see e.g., FIG. 1A). The fore optics assembly 32 can comprise a plurality of mirrors (e.g., FIG. 2) that reflect light rays 36 about the wide field of view W centered around the Sun S. For example, the fore optics assembly 32 can comprise a primary mirror 37$a$, a first secondary mirror 37$b$, a tertiary mirror 37$c$, and a quaternary mirror 37$d$. These mirrors can make-up the fore optics assembly 32 and the imaging aspect of the coronagraph optical system 30 that reflects light rays 36 to aft optics assembly 38, which reflects the light rays 36 to at least one sensor 40. In one example, the fore optics mirrors 37$a$-$d$ can be of the WALRUS-folded-type fore optics. An example of a WALRUS-folded-type fore optics is described in detail in U.S. Pat. No. 5,331,470 to Lacy G. Cook entitled "Fast Folded Wide Angle Large Reflective Unobscured System," the entire contents of which are incorporated herein by reference. In one example, the aft optics assembly 38 can comprise the five-reflection finite conjugate relay system as described in U.S. Pat. No. 5,078,502 to Lacy G. Cook (i.e., can comprise an all-reflective reimaging and derogating optical system), which is incorporated herein by reference in its entirety.

A fold mirror 42 can be optically supported (e.g., positioned) between the fore optics assembly 32 and the aft optics assembly 38 at the image formed by the fore optics, to reflect the light rays 36 to the aft optics assembly 38 and to the sensor 40. The fold mirror 42 can have an aperture (not shown in FIG. 1B, but similar to aperture 24 of fold mirror 22 of FIG. 1A) defining an angular subtense sized larger than the angular subtense of the Sun S (e.g., see the discussion regarding FIG. 2-3D below). The fold mirror 42 is positionable, such that a direct solar image 46 of the Sun S, reflected by the fore optics assembly 32, passes through the fold mirror aperture while the entrance aperture 34 of the fore optics assembly 32 is continuously positioned towards the Sun S.

A thermal control system can be incorporated to coronagraph optical system 30 to control the temperature of the coronagraph optical system 30 so that it can continuously reflect the wide field of view to the sensor 40 (without unacceptable degradation of the various mirrors and the sensor 40). This thermal control system is partially illustrated in FIG. 1B. For example, each of the mirrors (37a-d) of the fore optics assembly 32 and the fold mirror 42 can have a heat transfer shroud 48a-e, respectively, operable therewith to remove or extract, by radiative means, heat from the mirrors 37a-d and fold mirror 42. As will be further discussed below, each shroud 48a-e can be radiatively coupled to the respective mirrors 37a-e and fold mirror 42. Each shroud 48a-e can also be thermally (e.g., directly/physically) coupled to at least one cold radiator (not shown) to transfer heat away from each mirror so that the coronagraph optical system 30 can continuously reflect the wide field of view W to the sensor 40 (as further discussed in the examples below).

The sensor 40 of the coronagraph optical system 30 can comprise different types of sensors, such as a longwave infrared focal plane array, a visible focal plane array. The visible focal plane array may be of the silicon-pin type, while the longwave infrared focal plane array may be of the silicon micro-bolometer type.

In one example, the system 30 can comprise a supplemental sensor 41 (e.g., image sensor) configured to receive the light rays 36 via a beam splitter 50 positionable within the path of the light rays 36 as reflected from the aft optics assembly 38. For instance, the beam splitter 50 can be of a conventional type with a suitable substrate material and a suitable multi-layer dielectric beamsplitter coating on the front surface and a suitable multi-layer dielectric antireflection coating on the back side. The supplemental sensor 41 can comprise a substantially similar sensor type as the sensor 40 discussed above. Both sensors 40 and 41 can simultaneously receive the light rays 36 reflected from the aft optics assembly 38.

Figure 2:
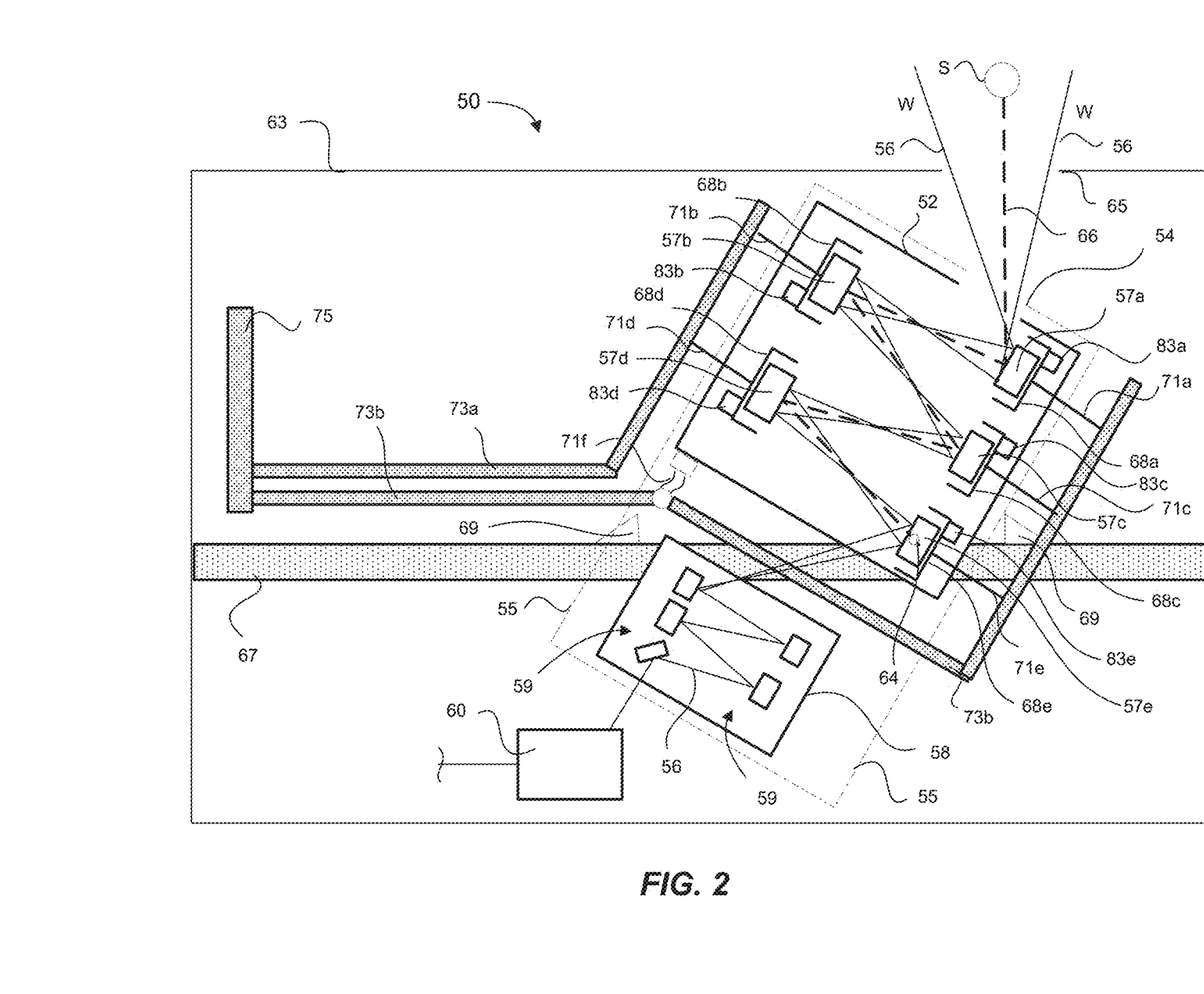
FIG. 2 illustrates a schematic of a coronagraph optical system in accordance with an example of the present disclosure.

FIG. 2 schematically illustrates an example coronagraph optical system 50, which is similar to the coronagraph optical systems 10 and 30 described above with reference to FIGS. 1A and 1B. The coronagraph optical system 50 can comprise a fore optics assembly 52 having an entrance aperture 54 positionable towards the Sun S (a thermal load and direct image 66 of the Sun S is represented by a dashed line at approximately the center of a wide field of view W through the aperture 54).

The fore optics assembly 52 can comprise a plurality of mirrors 57a-d that reflect light rays 56 (only one or two rays illustrated for illustration clarity) about the wide field of view W centered around the Sun S. The fore optics assembly 52 can be positioned within an optical bench 55 that houses and supports the fore optics assembly 52 including a primary mirror 57a, a secondary mirror 57b, a tertiary mirror 57c, a quaternary mirror 57d, and a fold mirror 57e. These fore optics mirrors 57a-d can be WALRUS-folded-type fore optics mirrors, as discussed above. The mirrors 57a-d can comprise the fore optics imaging aspect of the coronagraph optical system 50 that reflects light rays to an aft optics assembly 58. In one example, the aft optics assembly 58 can comprise a plurality of mirrors 59 that reflect the light rays 56 to the sensor 60 (or, in another example, two sensors simultaneously, as described in FIG. 1B). In one example, the plurality of mirrors 59 are housed and supported in the optical bench 55. The aft optics assembly 58 can comprise a five-reflection finite conjugate relay system, as described above.

In one example, the coronagraph optical system 50 comprises a system optical bench 63 that supports the components of the coronagraph optical system 50 (i.e., fore and aft optics assemblies, imaging components, sensors, electronic devices, thermal control system components, optical bench etc.). The system optical bench 63 can have a real aperture 65 that can be sized to allow passage of the wide field of view Was directed towards the Sun S.

In one example, a strong back 67 (i.e., a mechanical structure) can be secured to the system optical bench 63, which structurally supports the optical bench 55. In this way, thermally isolating kinematic flexures 69 can secure the optical bench 55 to the strong back 67. The strong back 67 can wrap around a perimeter of the optical bench 55 and be structurally coupled by the thermally isolating kinematic flexures 69.

A thermal control system (or subsystem) can be incorporated into the coronagraph optical system 50 to control the temperature of the coronagraph optical system 50 so that it can continuously reflect the wide field of view W to the sensor 60 without suffering degradation of any and all the mirrors of the system 50. For example, each of the fore optics mirrors 57a-d and the fold mirror 57e can have a heat transfer shroud 68a-e radiatively coupled to respective mirrors 57a-e (e.g., FIGS. 3A and 3B). Each shroud 68a-e can be comprised of an aluminum (e.g., 6061 T1) shroud painted black to enhance thermal coupling between the shroud and the respective mirror, or any suitable material for the rapid transfer of heat. Each of the shrouds 68a-e discussed herein with respect to any example shown in any of the figures can be similarly formed and configured.

Each shroud 68a-e can also have a heat transfer member 71a-e operable therewith, such as a flexible metal strap, that conductively transfers heat away from each shroud 68a-e to a cold-bias heat pipe 73a or 73b, as illustrated in FIG. 2. Both cold-bias heat pipes 73a and 73b can be coupled to a cold radiator 75 that draws heat away from the mirrors 57a-e (and optical bench 55), as further discussed below. The cold radiator 75 can provide a cold sink for the transport heat pipes 73a and 73b, the flexible heat transfer members 71a-e, and the shrouds 68a-c to dump/remove energy absorbed via the sun and surrounding environment such that gas or fluid is cooled at the cold radiator and then caused to be traversed through the heat pipes 73a and 73b in a loop to dump heat, for example.

Figure 3A:
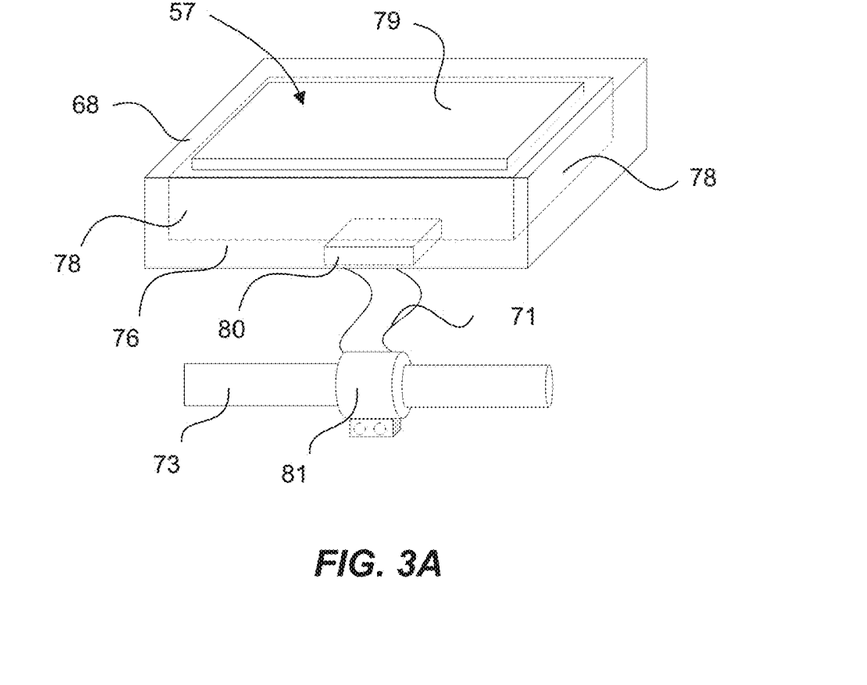
FIG. 3A illustrates an isometric view of a portion of a thermal control system in accordance with an example of the present disclosure.
Figure 3B:
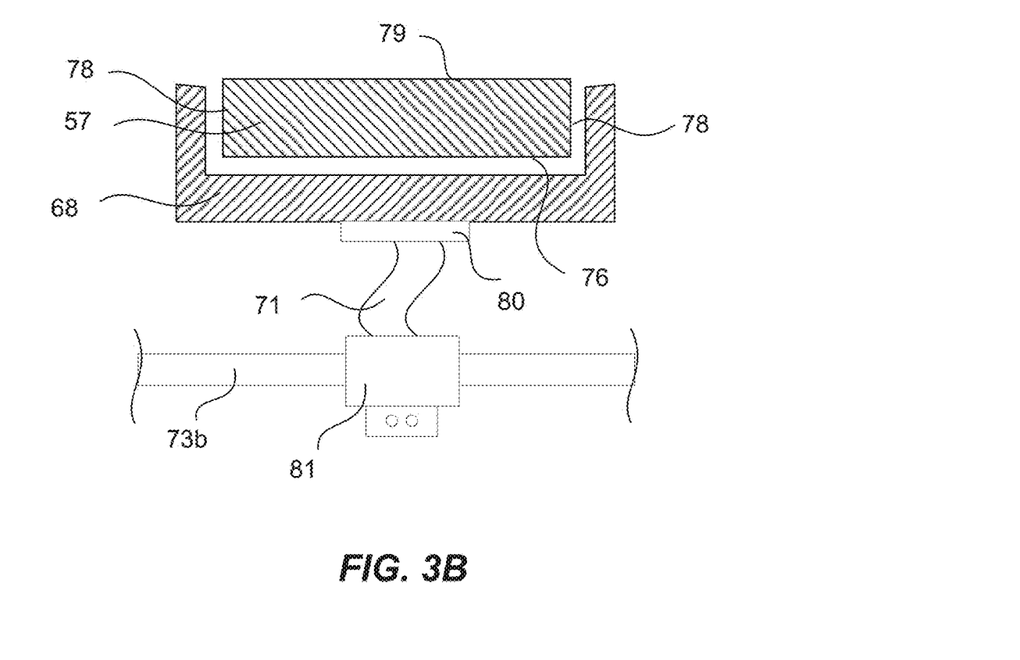
FIG. 3B illustrates a cross sectional view of FIG. 3A.

In one example illustrated in FIGS. 3A and 3B, a mirror 57 (any of mirrors 57a-e) can be spatially surrounded by a shroud 68 situated about the back 76 and sides 78 (all four sides) of the mirror 57. FIG. 3B shows a cross sectional view of the mirror 57 and the shroud 68. As illustrated, the mirror 57 tends to "float" about the shroud 68 (FIG. 3B) while a reflecting surface 79 of the mirror 57 remains exposed. In one example, the mirror 57 can be flexure mounted to an optical bench in a typical manner of mounting a reflective mirror to an optical bench or other structure (e.g., with a kinematic titanium flexure mount between the bench 55 and the mirror 57a-e, for instance). The shroud 68 can be similarly (or differently) mechanically mounted to the optical bench adjacent the mirror 57, but in such a manner so as to thermally isolate said shroud from said bench. This can be accomplished through the use of titanium (or similar) thermal isolators to provide both thermal isolation and compliance. In this manner, the dominant thermal path is not to the optical bench, but to the conductive heat transfer member and then to the cold-bias heat pipe and then ultimately to the cold radiator.

In one example, a heat transfer member 71 can thermally couple the shroud 68 to a cold-bias heat pipe 73 (e.g., see heat pipes 73a or 73b of FIG. 2 also). In one aspect, a mount member 80 (e.g., a metal bulkhead) can be mounted to the bottom of the shroud 68. One end of the heat transfer member 71 can be coupled to the mount member 80, and the other end of the heat transfer member 71 can be coupled to a pipe mount 81 (or to a metal mount attached to the optical bench). Both the mount member 80 and the pipe mount 81 can be comprised of a material (e.g., metal) that thermally conducts heat, such as copper, aluminum, and many other conductive materials. The pipe mount 81 can be two pieces clamped together by fasteners and clamped around the pipe 73, although other physical, thermal couplings are possible. In one example, the heat transfer member 71 can comprise a flexible heat strap comprised of material that readily transfers heat, such as many metals and metal alloys. The heat transfer member in the form of a flexible heat strap provides (compliance) flexibility between the shroud 68 and the heat transfer pipe 73, wherein the shroud 68 can move (e.g., expand) relative to the heat transfer pipe 73 to account for differing coefficients of thermal expansion (CTEs) between the shroud 68, the heat transfer member 71, and the heat pipe 73.

As illustrated on FIG. 3B, in one example the entire upper surface area 79 of the mirror 57 conducts heat (downwardly through the mirror) and then radiates continuously to the shroud 68 for drawing heat from the mirror 57 imparted thereon due to the solar thermal load generated on the mirror 57. This "radiative" coupling between the mirror 57 and the shroud 68 is particularly significant when using non-metal mirrors (e.g., silicon carbide, low expansion glass), for instance, because it is undesirable to directly couple thermal conductors (e.g., a metal heat transfer member 71) to such non-metal mirrors because of the large difference in CTEs. That is, the mirror 57 (e.g., one made of silicon carbide, low expansion glass) can have a very low CTE, and the heat transfer member 71 (e.g., one made of aluminum, steel) can have a much higher CTE, so it is advantageous to radiatively couple a component (e.g., shroud 68) to such mirrors for the purpose of drawing away unwanted heat (including other reasons, such as minimizing or avoiding clamping stresses on the mirror). Additionally, radiative coupling between the mirror and the shroud is superior to conventional conductive means (such as straps) in that the radiative path is evenly operative over the entire mirror back surface and provides a more uniform heat flow and temperature than can be achieved with straps, which are more localized, and therefore more non-uniform, in their operation.

Figure 3C:
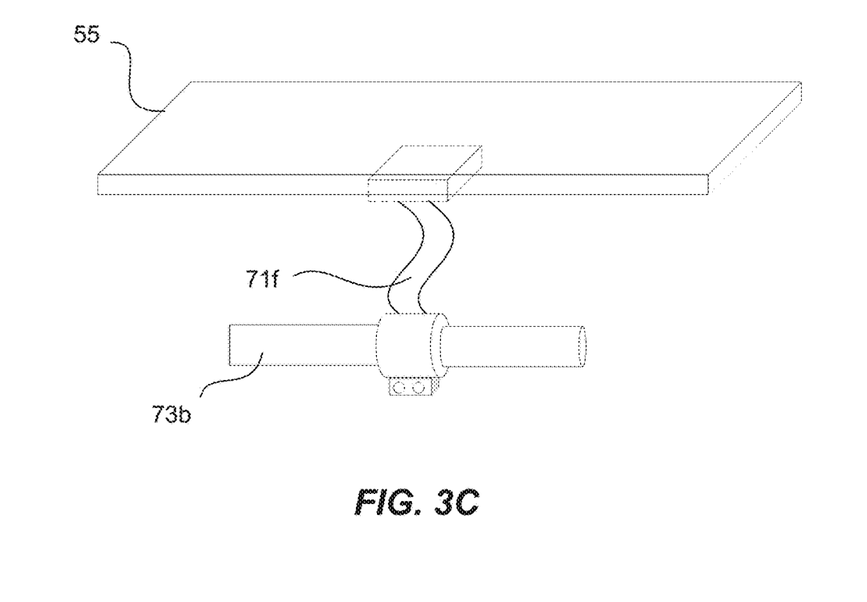
FIG. 3C illustrates an isometric view of a portion of a thermal control system in accordance with an example of the present disclosure.

Turning back to FIG. 2, each shroud 68a-e is thermally (e.g., physically) coupled or linked to the cold radiator 75 via heat transfer members 71a-e and heat pipes 73a and 73b to transfer heat away from each respective mirror 57a-e so that the system 50 can continuously reflect the wide field of view W to the sensor 60. Note that FIG. 2 schematically shows heat transfer members 71a-e extending through optical bench 55 for purposes of illustration clarity, however a portion of the pipes 73a and 73b would be inside the optical bench 55 and adjacent respective shrouds 68a-e (as illustrated in FIG. 3A). Various other configurations can achieve the same result of drawing heat away from the mirrors 57a-e. For instance, the flexible heat transfer members 71a-e can be directly coupled between the shrouds 68a-e, respectively, and the optical bench 55, and then cold-bias pipe(s) 73a and 73b can be thermally coupled (e.g., strapped) to the optical bench 55 to draw heat away from the optical bench 55. FIG. 2 and FIG. 3C illustrate this configuration. FIG. 3C shows an optical bench 55 thermally coupled to a heat pipe 73b via a flexible heat transfer member 71f (also referenced in FIG. 2), although such configuration could cause optical degradation issues, it is possible to thermally couple an optical bench to a heat pipe in this manner. Thus, any heat absorbed by the optical bench 55 can be transferred to a cold-bias radiator 75 by pipe 73b (such as solar heat absorbed by the optical bench 55 near the entrance aperture 54).

Turning now specifically to a method and system for controlling temperature of the components in the optical bench 55 of FIG. 2, as a solar load enters the aperture, some of the solar load is absorbed by the optical bench 55 (i.e., it can be painted black to absorb some solar load before entering the optical bench 55). In some examples, the optical bench is comprised of a low thermal expansion material, such as a low expansion composite (e.g., carbon fiber) having a CTE between $-0.8 \times 10^{-6}$/K and $1.0 \times 10^{-6}$/K. In some examples, the fore optics mirrors and the fold mirror (of the examples herein) can also be comprised of low thermal expansion material, such as silicon carbide (having a CTE at approximately 2.4 E-6/K), or ultra low expansion glass (having a CTE at approximately $10^{-8}$/K at 5-35° C.). Of note, "ultra low expansion glass" or "ULE® Glass" is marketed under a trademark owned by Corning, Inc.

Accordingly, the optical bench 55 can absorb some solar load, and the remaining solar load can be progressively absorbed about each of the fore optics mirror 57a-d until the final/remaining solar load passes through the fold mirror 57e and is absorbed by the shroud 83e, as shown and described above. Thus, virtually no solar load (or negligible load) is transferred to the aft optics mirrors 59 or the sensor 60. In one example, at the primary mirror 57a, about 2-5 Watts of power can be absorbed by the mirror 57a from the solar load entering the optical bench, and then such absorbed solar load can be radiatively transferred to the shroud 68a, and then eventually (conductively) transferred to the cold radiator 75 (as discussed in examples above) by way of heat pipe 73b. This heat transfer process continues about each mirror 57b-d such that, at each mirror, at least some (e.g., about 5%) of the solar load is progressively removed before being reflected to the fold mirror 57e. Thus, once the light rays 56 and the direct solar image 66 are received at the quaternary mirror 57d (i.e., the final mirror of fore optics imaging), an amount of solar load remains (e.g., up to about 80% of the original solar load can remain). The remaining solar load reflected by the quaternary mirror 57d can be substantially (or entirely) removed by passage of that solar load through the aperture in fold mirror 57e.

Figure 3D:
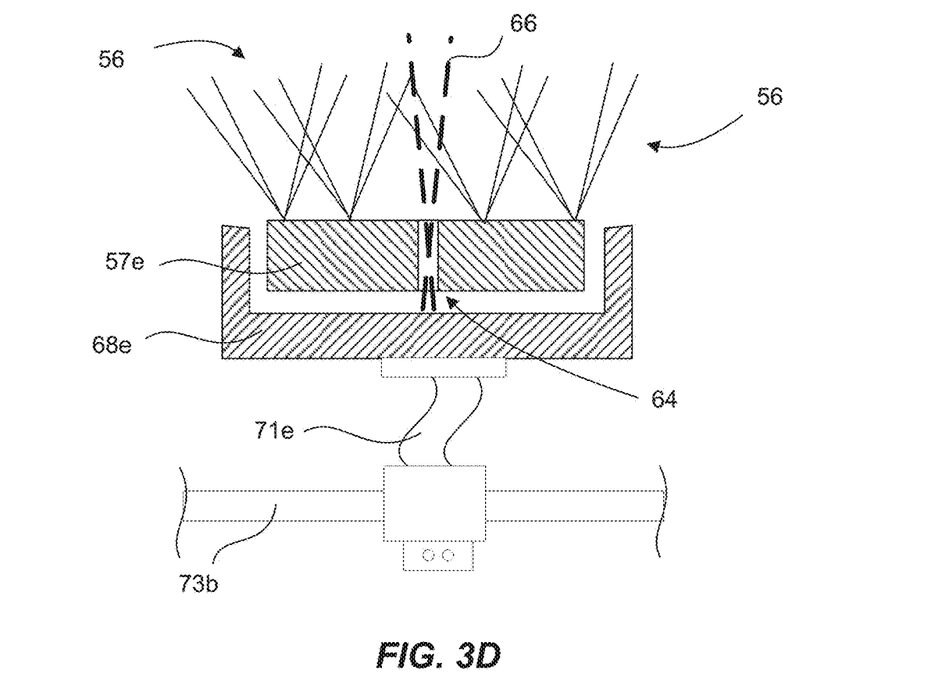
FIG. 3D illustrates a cross sectional view of a fold mirror and a portion of a thermal control system in accordance with an example of the present disclosure.

For example, as best illustrated in FIG. 3D, and with reference to FIGS. 2 and 3D, the fold mirror 57e can have an aperture 64 defining an angular subtense sized larger than the angular subtense of the Sun S. As known, the angular subtense of the Sun is approximately 0.5 degrees. As such, the aperture 64 can have an angular subtense that is at least 0.5 degrees. Preferably, the angular subtense of the aperture 64 is approximately 1.0 degrees (i.e., oversized by a factor of 2 relative to the subtense of the Sun). This would mean that a diameter of the aperture 64 could be 1.75 millimeters in this example with a particular fore optics focal length of 100 mm to arrive at an angular subtense of the aperture 64 being 1.0 degree. This size of aperture 64 (e.g., diameter of 1.75 mm and angular subtense of 1.0 degree) allows for an acceptable amount of "line of sight drift" of the system (e.g., a telescope), pointing errors (e.g., the telescope being pointed to the Sun), and thermal expansions (e.g., of mirrors, benches, etc.), all while not sacrificing too much field of view through the aperture 64. However, the angular subtense of the aperture 64 could be greater than 1.0 degree, such as 1.5, or 2.0 degrees, or even greater. Generally speaking, the aperture can be at least as large as the solar image (diameter of aperture=EFLf*tan 0.5 deg, where EFLf is the effective focal length of the foreoptics (solar angular subtense is 0.5 degrees)). In one aspect, the aperture can be larger than the solar image to allow for small boresight errors (diameter of the aperture=EFLf*tan 1.0 deg). This allows for about 4 mrad radial boresight error about the true solar angle. In another aspect, the aperture should be small enough, such that the field of view outage the hole creates is not detrimental to the operation of the coronograph.

The fold mirror 57e is positionable, such that the direct solar image 66 of the Sun S passes efficiently through the aperture 64 to the shroud 68e, wherein the remaining thermal load imparted by the Sun S can be removed, thus removing all (or most) of the remaining solar thermal load from the system before the light rays 56 are reflected to the aft optics mirrors 59. In one aspect, aft optics mirrors 59 can be comprised of aluminum or beryllium (i.e., having a higher CTE than the fore optics mirrors) as virtually no solar load is imparted to the aft optics mirrors 59.

Turning back to FIG. 2, heaters 83a-e can be coupled to the respective shroud to provide a sink temperature so that the optical components (i.e., mirrors) are controlled to 20 degrees Celsius. Thus, each heater can have a feedback temperature sensor associated with the respective mirror to indicate the operating temperature of said mirror. In some examples, the mirrors 57a-e will operate at about 20 degrees Celsius (to avoid degradation and provide a healthy telescope with acceptable wavefront errors, for instance). The respective shroud could then operate at approximately 5-10 degrees Celsius, and the respective heat pipe could operate at 0 degrees Celsius, for example. However, removing heat from each mirror 57a-e via the cold radiator 75, for instance, may result in a mirror 57a-e operating "too cold" (i.e., well-below 20 degrees C.), which can affect image quality, etc. Thus, the heaters 83a-e can be controlled (e.g., by a computer system) to provide a predetermined amount of heat to each mirror 57a-e to operate at or near and to maintain ideal operating temperatures (e.g., 20 degrees C.). This is advantageous because the primary mirror 57a receives more solar load than the quaternary mirror 57d, for instance, so controlling the operating temperature at each particular mirror 57a-e with a heater helps to reflect an image to the sensor that is not distorted. The heaters are also advantageous when there is a solar eclipse, for instance, where the mirrors may be operating much "too cold". Thus, the heaters can be operable to heat the mirrors in needed circumstances to facilitate operation of the mirrors and the imaging system at healthy, steady temperature levels (e.g., 20 degrees C.). Generally, "a healthy telescope" can be a telescope that can reflect light rays and a solar image with an acceptably small amount of degradation of optical components of the system such that a detector/sensor can effectively receive and transmit an acceptable image for typical processing and analysis, for instance. The image quality of "a healthy telescope" is very nearly that of the ideal telescope design as implemented in hardware, and is capable of operating successfully relative to its intended purpose.

The disclosed thermal control system can control the temperature at each mirror (as discussed above) to provide a steady state at each mirror to minimize wavefront error. For instance, each mirror can (uniformly and steadily) absorb 2 Watts of power, for instance, (e.g., due to the shroud and heater), which minimizes the gradient error on the mirror, which therefore minimizes surface figure error and minimizes wavefront error within the optical system.

The disclosed optical systems also provide an all-reflective coronograph with a low f-number (i.e., a "fast" optical system) while viewing a wide field of view and while reflecting short and long wave imaging to the sensor(s). The f-number (sometimes called focal ratio, f-ratio, f-stop, or relative aperture) of an optical system is the ratio of the lens's focal length to the diameter of the entrance pupil. It is a dimensionless number that is a quantitative measure of light gathering ability. In the embodiment of FIG. 1B, the equivalent imaging f-number is F/2.25; the non-circular nature of the entrance pupil with an aspect ratio of about 1.77X results in an f-number of F/2.88 in the plane of FIG. 1B, and an F-number of F/1.62 in the orthogonal plane.

Figure 4:
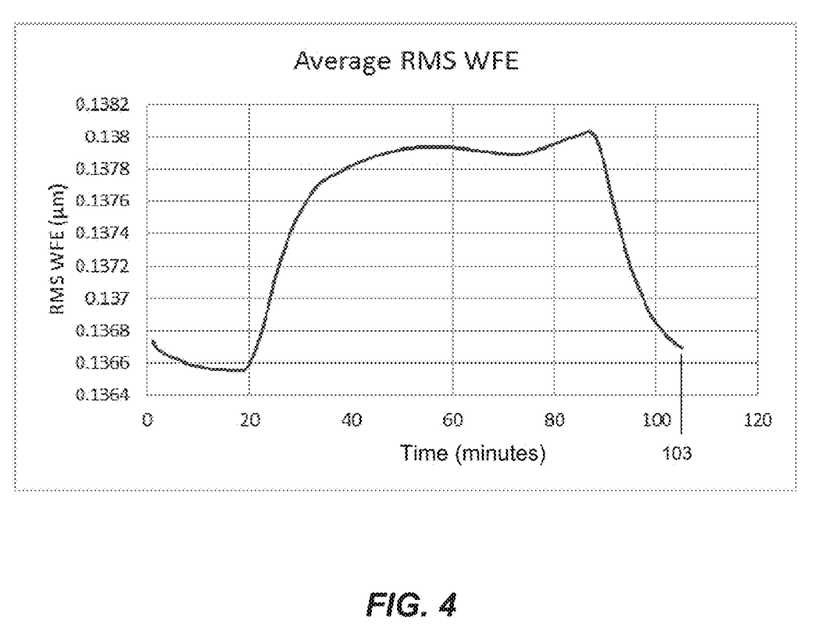
FIG. 4 illustrates a graph of an average RMS WFE of components of a coronagraph optical system in accordance with an example of the present disclosure.

FIG. 4 is a graph that illustrates that the optical system examples of FIGS. 1A-3D operate effectively (i.e., operate as a healthy telescope with acceptable change from nominal). For instance, the field of view average root mean square (RMS) wavefront error (WFE) is shown on the y-axis (in μm), and time scale during operation/orbit (minutes) is shown on the x-axis (i.e., to 120 minutes). This graph shows the average RMS WFE for a variety of fields of view (from 0 degrees up to 35 degrees) where the fore optics mirrors are comprised of ultra-low expansion glass and where the optical bench is comprised of a low expansion composite (as discussed herein). This graph illustrates that there is only approximately a 1.1% degradation change from nominal when imaging a wide field of view centered around the Sun. This is a very small and acceptable percentage change so that the optical system can effectively, continuously image as intended and discussed above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A coronagraph optical system for continuously imaging a wide field of view, the optical system comprising:
    a fore optics assembly having an entrance aperture positionable towards the Sun, the fore optics assembly comprising a plurality of mirrors that reflect light rays about a wide field of view centered around the Sun;
    an aft optics assembly configured to reflect the light rays to at least one sensor;
    a fold mirror optically supported between the fore optics assembly and the aft optics assembly to reflect the light rays to the aft optics assembly, the fold mirror having an aperture defining an angular subtense sized larger than the angular subtense of the Sun, wherein the fold mirror is positionable such that a direct solar image of the Sun, reflected by the fore optics assembly, passes through the aperture; and
    a thermal control subsystem comprising a plurality of heat transfer shrouds each spatially separated from, and radiatively coupled to, a respective one of the plurality of mirrors of the fore optics assembly to progressively absorb heat from the plurality of mirrors from a solar load from the Sun, wherein one of the plurality of heat transfer shrouds is spatially separated from, and radiatively coupled to, the fold mirror, such that the direct solar image can pass through the aperture of the fold mirror to the one heat transfer shroud to absorb heat from the solar load from the Sun, such that the entrance aperture can be continuously positioned towards the Sun.

2. The coronagraph optical system of claim 1, wherein the plurality of mirrors of the fore optics assembly and of the aft optics assembly comprise reflective mirrors, the at least one sensor comprising a longwave infrared focal plane array, and wherein the coronagraph optical system comprises an all-reflective telescope operable to image a wide field of view while continuously imaging the Sun.

3. The coronagraph optical system of claim 1, wherein each heat transfer shroud at least partially surrounds five sides of the respective plurality of mirrors and fold mirror.

4. The coronagraph optical system of claim 1, wherein the fore optics assembly further comprises an optical bench containing the plurality of mirrors and the fold mirror, and wherein the thermal control subsystem comprises a plurality of heat transfer members each thermally coupled to one of the heat transfer shrouds and the optical bench, wherein the plurality of heat transfer members are thermally coupled to at least one cold-bias heat pipe.

5. The coronagraph optical system of claim 4, wherein the thermal control subsystem comprises a primary heat transfer member thermally coupled to the optical bench and at least one cold-bias heat pipe.

6. The coronagraph optical system of claim 5, wherein the thermal control subsystem comprises a plurality of heaters thermally coupled to each of the plurality of mirrors and the fold mirror for controlling the temperature of the fore optics assembly.

7. The coronagraph optical system of claim 4, wherein the plurality of mirrors, the fold mirror, and the optical bench are each comprised of a low thermal expansion material comprising at least one of silicon carbide, low expansion glass, and low expansion composite.

8. The coronagraph optical system of claim 4, wherein each heat transfer shroud is radiatively coupled about a majority of a surface area of each of the plurality of mirrors and the fold mirror.

9. The coronagraph optical system of claim 4, wherein the wide field of view is between approximately 5 degrees and approximately 30 degrees.

10. The coronagraph optical system of claim 1, wherein the aft optics assembly comprises a plurality of reflective mirrors, and wherein the fore optics and the aft optics assemblies facilitate an all-reflective optical path.

11. The coronagraph optical system of claim 1, wherein the optical system comprises a steady state position in which the at least one sensor is configured to continuously be directed to a line of sight of the Sun for a predetermined time period.

12. The coronagraph optical system of claim 1, wherein the at least one sensor comprises at least one of a longwave infrared focal plane array and a visible focal plane array.

13. The coronagraph optical system of claim 12, further comprising a dichroic beam splitter operable to split light rays to the longwave infrared focal plane array and to the visible focal plane array to image objects in two spectral bands.

14. A coronagraph optical system for continuously imaging a wide field of view, the optical system comprising:
    a fore optics assembly having an entrance aperture positionable towards the Sun, the fore optics assembly comprising a plurality of mirrors that reflect light rays about a wide field of view centered around the Sun;
    an aft optics assembly configured to reflect the light rays to at least one sensor;
    a fold mirror optically coupled between the fore optics assembly and the aft optics assembly and configured to reflect the light rays to the aft optics assembly, the fold mirror having an aperture defining an angular subtense sized larger than the angular subtense of the Sun; and
    a thermal control system operably coupled to the plurality of mirrors and the fold mirror, the thermal control system comprising at least one radiator thermally coupled to a plurality of heat transfer shrouds, each spatially separated from, and radiatively coupled to, a respective one of the plurality of mirrors and the fold mirror to facilitate transfer of heat, such that a direct solar image can pass through the aperture of the fold mirror to the respective heat transfer shroud to absorb heat from a solar load from the Sun, and such that the entrance aperture can be continuously positioned towards the Sun.

15. The coronagraph optical system of claim 14, wherein each heat transfer shroud is out of direct contact with the respective plurality of mirrors and the fold mirror.

16. The coronagraph optical system of claim 14, wherein the thermal control system comprises a plurality of flexible heat transfer members and an optical bench in support of the plurality of mirrors and the fold mirror, each flexible heat transfer member thermally coupled between one heat transfer shroud and a cold-bias heat pipe coupled to the at least one radiator.

17. A method for continuously imaging a wide field of view centered about the Sun using a coronagraph optical system, the method comprising:

positioning an entrance aperture of a fore optics assembly of a coronagraph optical system towards the Sun, the fore optics assembly comprising a plurality of mirrors that reflect light rays about a wide field of view centered about the Sun;

positioning an aperture of a fold mirror approximately toward a direct solar image of the Sun to at least partially remove a solar load on the coronagraph optical system, wherein the fold mirror reflects the light rays from the fore optics assembly to the aft optics assembly; and controlling a temperature of the plurality of mirrors and the fold mirror via a thermal control subsystem comprising a plurality of heat transfer shrouds each spatially separated from, and radiatively coupled to, a respective one of the plurality of mirrors of the fore optics assembly to progressively absorb heat from the plurality of mirrors from a solar load from the Sun, and wherein one heat transfer shroud is spatially separated from, and radiatively coupled to, the fold mirror such that a direct solar image can pass through the aperture of the fold mirror to the heat transfer shroud to absorb heat from the solar load from the Sun; and continuously pointing the entrance aperture towards the Sun.

18. The method of claim 17, further comprising positioning the aft optics assembly to reflect the light rays to at least one sensor.

19. The method of claim 17, further comprising removing all or most of the solar load from the coronagraph optical system before the light rays are reflected to the aft optics assembly by the fold mirror.

20. The method of claim 17, further comprising transferring heat away from each of the plurality of mirrors and the fold mirror via at least one cold-bias heat pipe thermally coupled to the radiator, wherein the at least one cold-bias heat pipe is thermally coupled to each of the plurality of mirrors and fold mirror by a heat transfer member coupled to the respective heat transfer shroud.

21. The method of claim 17, wherein the aperture of the fold mirror defines an angular subtense sized larger than the angular subtense of the Sun such that the direct solar image passes through the aperture of the fold mirror to the respective heat transfer shroud.

22. The method of claim 17, further comprising simultaneously imaging objects in two spectral bands by splitting the light rays to a longwave infrared focal plane array and to a visible focal plane array.

* * * * *